United States Patent [19]

Bishel et al.

[11] Patent Number: 5,308,698
[45] Date of Patent: May 3, 1994

[54] FLUX FOR COATED WELDING ELECTRODE

[75] Inventors: Robert A. Bishel; Evan B. Hinshaw, both of Huntington, W. Va.

[73] Assignee: Inco Alloys International, Inc., Huntington, W. Va.

[21] Appl. No.: 887,195

[22] Filed: May 21, 1992

[51] Int. Cl.$^5$ ............................................. B32B 9/00
[52] U.S. Cl. ............................ 428/385; 428/386; 219/146.22
[58] Field of Search ................................ 428/385, 386

[56] References Cited

U.S. PATENT DOCUMENTS

| | | | |
|---|---|---|---|
| 2,798,824 | 7/1957 | Le Grand | 117/206 |
| 3,770,427 | 11/1973 | Petersen | 75/171 |
| 3,967,036 | 6/1976 | Sadowski | 428/386 |
| 4,010,309 | 3/1977 | Peterson | 428/386 |

*Primary Examiner*—Patrick J. Ryan
*Assistant Examiner*—Cathy Lee
*Attorney, Agent, or Firm*—Blake T. Biederman; Edward A. Steen

[57] ABSTRACT

The invention provides a coated electrode for producing a nickel-base weld deposit containing at least 12 weight percent chromium. The coated electrode includes a flux surrounding the core wire. The flux includes in parts by weight 5 to 35 strontium carbonate, 5 to 35 total metal carbonate compound, 0 to 20 manganese with at least 5 manganese present when less than 0.5 weight percent manganese is present in the core wire, 10 to 40 fluoride compound and 5 to 45 oxide compound. A binder is used to hold the flux to the core wire.

19 Claims, No Drawings

FLUX FOR COATED WELDING ELECTRODE

Nickel-chromium-iron alloys have been developed with increased chromium contents for improved resistance to several corrosive aqueous environments. High chromium nickel-base alloys provide excellent resistance to corrosion in elevated temperature environments. For example, nickel-base alloys containing 24 to 32 weight percent chromium have been used for nuclear steam generators and particularly for tubing applications. Nickel-base tubing having higher chromium content, such as Inconel ® alloy 690 (Inconel is a registered trademark of the Inco family of companies), is currently being used to replace original lower chromium content tubing in nuclear applications to increase the tube life.

A welding flux and coated electrode specifically developed for Inconel ® alloy 690 is disclosed by W. A. Peterson in U.S. Pat. No. 4,010,309 ('309 patent). Actual commercial flux that evolved from the Peterson composition contained by weight percent 26 calcium carbonate, 15 barium carbonate, 15 calcium carbonate, 15 titanium dioxide, 14 manganese powder, 10 iron-niobium, 2 bentonite, 1 calcined alumina, 1 talc and 1 hydroxyethylcellulose held together with a sodium silicate/water binder. The commercial flux of Peterson has two disadvantages. First, the commercial flux of the '309 patent contains barium carbonate as an essential ingredient for slag formation. If any flux coating containing barium type ingredient is lost, spilled or leftover during the manufacturing of the flux, it must be disposed of as hazardous 7aste since the barium compound could leak into a water table when in powder form. Second, the commercial flux of the '309 patent has a strong tendency to absorb moisture during storage. The commercial flux of the '309 patent requires rebaking to produce porosity free overhead felds.

It is an object of this invention to produce a barium-free welding flux for high chromium nickel-base alloys.

It is a further object of this invention to provide a flux that does not require re-baking for producing porosity free overhead welds.

SUMMARY OF THE INVENTION

The invention provides a coated electrode for producing a nickel-base weld deposit containing at least 12 weight percent chromium. The coated electrode includes a flux surrounding the core wire. The flux includes in parts by weight 5 to 35 strontium carbonate, 5 to 35 total metal carbonate compound, 0 to 20 manganese with at least 5 manganese present when less than 0.5 weight percent manganese is present in the core wire, 10 to 40 fluoride compound and 5 to 45 oxide compound. A binder is used to hold the flux to the core wire.

DESCRIPTION OF PREFERRED EMBODIMENT

Several test fluxes were used to coat 0.318 cm diameter Inconel ® alloy 690 or 691 core wire to form test electrodes. Nominal composition of Inconel alloy 690 is by weight percent 58 minimum nickel, 27 to 31 chromium, 7 to 11 iron, 0.05 maximum carbon, 0.5 maximum silicon, 0.5 maximum silicon, 0.5 maximum manganese, 0.015 maximum sulfur and 0.5 maximum copper. Nominal composition of Inconel ® alloy 691 is by weight percent 28.0 to 31.5 chromium, 7 to 11 iron, 1.10 maximum aluminum, 1.0 maximum titanium, 1.5 maximum aluminum plus titanium, 1.0 maximum manganese, 0.5 maximum silicon, 0.30 maximum copper, 0.04 maximum carbon, 0.015 maximum sulfur and balance nickel. Samples were extruded at a pressure of about 27 to 55 MPa and baked at 370° C. for 1.5 hours. The coated electrodes were incrementally heated to 370° C. and slow cooled after baking. All flux samples were combined at a ratio wherein total flux mass equalled 25 to 35 weight percent of the core wire weight. All samples were prepared with a binder consisting of binder measuring about 22 parts by weight having 0.5 parts by weight lithium-sodium polysilicate, 20 parts by weight sodium silicate and 1.5 parts by weight water. Lithium-sodium polysilicate solution had manufacturer's specifications of 1.7–1.9% $Li_2O$, 1.1–1.3% $Na_2O$, 17.8–22.2% $SiO_2$, pH of 10.6–10.8 and specific gravity at 25° C. of 1.19 g/cm$^3$. Manufacturer's specification of sodium silicate used was 31.3–32.5% $SiO_2$, 10.5–11.5% $Na_2O$ and 2.83–2.98% $SiO_2$+NaO, viscosity at 20° C. of 780–1140 centipoise and specific gravity at 20° C. of about 1.59–1.67 g/cm$^3$. The test fluxes contained varied amounts of several additives. The test coated electrodes were then used to establish operable welding parameters and to determine the optimal flux composition for welding high chromium nickel-base alloys such as alloys having at least 12 weight percent chromium. Advantageously, nickel-base alloy welds of the invention contain at least 20 weight percent chromium. In particular, the flux of the invention is especially useful for nickel-base alloys having 24 to 32 weight percent chromium and up to 15 weight percent iron.

Table 1 contains the first series of fluxes that was tested.

TABLE 1

| Ingredient | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Bentonite | 2 | 2 | 2 | 2 | 2 | 2 | 2 | 2 | 2 | 2 | 2 | 2 | 2 | 2 | 2 |
| Calcium silicate | — | — | — | — | — | — | — | — | — | — | — | — | — | — | — |
| Calcium fluoride | — | — | 6 | — | 6 | 6 | 6 | 6 | 6 | 6 | 5 | 5 | 5 | 5 | 5 |
| Lithium carbonate | — | — | — | — | — | — | — | — | — | — | — | — | — | — | — |
| Nepheline syenite | — | — | — | — | — | — | — | — | — | — | — | — | — | — | — |
| Calcined alumina | 1 | 1 | 1 | 1 | — | — | — | — | — | — | — | — | — | 4 | — |
| Magnesium oxide | — | — | — | — | — | — | — | — | — | — | — | — | 4 | — | — |
| Electrolytic manganese | 10 | 10 | 10 | 10 | 10 | 5 | 5 | 5 | 5 | 7 | 7 | 8 | 8 | 8 | 8 |
| Chromium powder | 11 | 9 | 9 | 9 | 9 | 9 | 9 | 9 | 9 | 9 | 9 | 9 | 9 | 9 | 9 |
| Nickel powder | 4 | 4 | 4 | 4 | 4 | 4 | 4 | 4 | 4 | 4 | 4 | 4 | 4 | 4 | 4 |
| Magnetite | 5 | — | — | — | — | — | — | — | — | — | — | — | — | — | 4 |
| Rutile | 16 | 16 | 16 | 16 | 8 | 8 | 8 | 8 | 8 | 15 | 18 | 15 | 15 | 15 | 15 |
| Potassium titanate | — | — | — | — | — | — | — | — | — | — | — | — | — | — | — |
| Calcium carbonate | 15 | 15 | 20 | 15 | 20 | 20 | 20 | 20 | 20 | 20 | 20 | 20 | 20 | 20 | 20 |
| Nickel columbium | 7.5 | — | — | — | — | — | — | — | — | — | — | — | — | — | — |
| Talc | 1 | 1 | 1 | 1 | 1 | 1 | 1 | 1 | 1 | 1 | 1 | 1 | 1 | 1 | 1 |
| Natrosol | 1 | 1 | 1 | 1 | 1 | 1 | 1 | 1 | 1 | 1 | 1 | 1 | 1 | 1 | 1 |
| Tri-Manox | — | — | — | — | — | — | — | — | — | — | — | — | — | — | — |

TABLE 1-continued

| Ingredient | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Ferro columbium | — | 7.5 | 7.5 | 7.5 | 7.5 | 7.5 | 4.5 | 4.5 | 4.5 | 7.5 | 7.5 | 6.5 | 6 | 6 | 6 |
| Strontium carbonate | 3 | 10 | — | — | — | — | — | — | — | — | — | — | — | — | — |
| Zirconium oxide | — | — | — | 8.5 | 10 | 10 | 10 | 10 | 10 | 7 | 5 | 5 | 5 | 5 | 5 |
| Cerium oxide | — | — | — | — | — | — | — | — | 4.5 | — | — | — | — | — | — |
| Cerium fluoride | — | — | — | — | — | — | — | 4.5 | — | — | — | 4.5 | — | — | — |
| Lanthanum carbonate | — | — | — | — | — | — | — | — | — | — | — | — | — | — | — |
| Synthetic cryolite | 24 | 25 | 25 | 25 | 25 | 25 | 25 | 25 | 25 | 20 | 20 | 20 | 20 | 20 | 20 |

All of the flux compositions contained in Table 1 produced acceptable weld deposits. Sample number 1 contained 3 parts by weight strontium carbonate which provided good operability. Sample number 2, at 10 parts by weight strontium carbonate, produced the most preferred combination of out of position welding characteristics. Sample number 2 contained 10 parts by weight strontium carbonate in the flux which was found to improve welding operability and especially welding operability during overhead welding. Ferro-columbium or iron-niobium of Table 1 contained 65% niobium, 34% iron and 1% aluminum. Samples 3-5 containing only calcium carbonate with no strontium carbonate, provided good welding performance, but operated fairly to poorly in the vertical position. Calcium carbonate used for the &,uxes in Tables 1-3 was Marflux brand calcium carbonate coarse powder having a size between 74 and 420 microns. Sample numbers 6-10, at 20 parts by weight calcium carbonate and 0 parts by 7eight strontium carbonate, all provided a good overall welding electrode. However, the coated electrode of samples 6-10 did not have the performance of sample number 2. Sample number 11, containing 18 parts by weight rutile, had good wetting, good weld bead appearance and excellent operability in the overhead welding position. Sample number 12 in which 4.5 parts by weight cerium fluoride was added had very good wetting, but produced a sloppy arc. Samples 13 and 14, containing 4 parts by weight magnesium oxide and calcined alumina respectfully, produced a slag that was more difficult to remove. In Sample number 15, 4 parts by weight magnetite was added. The magnetite of Sample 15 did not contribute to operability, produced a dull bead, but did lower silicon content in the weld deposit.

Table 2 contains additional fluxes that were tested in deriving optimal welding characteristics.

TABLE 2

| Ingredient | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| Bentonite | 2 | 2 | 2 | 2 | 2 | 2 | 2 | 2 | 2 | 2 | 2 | 2 | 2 | 2 | 2 |
| Calcium silicate | — | — | 3 | — | — | — | — | — | — | — | — | — | — | — | — |
| Calcium fluoride | 5 | 6 | 6 | 6 | 6 | 6 | — | — | — | — | — | — | — | 3 | 14 |
| Lithium carbonate | 4 | — | — | — | — | — | — | — | — | — | — | — | — | — | — |
| Nepheline syenite | — | — | — | 3 | — | — | — | — | — | — | — | — | — | — | — |
| Calcined alumina | — | — | — | — | — | — | 1 | 1 | 1 | 1 | 1 | 1 | 1 | 1 | 1 |
| Magnesium oxide | — | — | — | — | — | — | — | — | — | — | — | — | — | — | — |
| Electrolytic manganese | 8 | 7 | 7 | 7 | 7 | 7 | 10 | 10 | 10 | 10 | 10 | 10 | 10 | 9 | 9 |
| Chromium powder | 9 | 9 | 9 | 9 | 9 | 9 | 9 | 9 | 9 | 9 | 9 | 9 | 9 | 9 | 9 |
| Nickel powder | 4 | 4 | 4 | 4 | 4 | 4 | 4 | 4 | 4 | 4 | 4 | — | — | — | — |
| Magnetite | — | — | — | — | — | — | — | — | — | — | — | — | — | — | — |
| Rutile | 15 | 15 | 13 | 13 | 13 | 13 | 16 | 16 | 16 | 16 | 16 | 16 | 16 | 16 | 16 |
| Potassium titanate | — | — | — | — | 3 | — | — | — | — | — | — | — | — | — | — |
| Calcium Carbonate | 20 | 18 | 18 | 18 | 18 | 18 | 15 | 15 | 15 | 15 | 15 | 15 | 15 | 10 | 10 |
| Nickel columbium | — | — | — | — | — | — | — | — | — | — | — | — | 8 | 8 | 8 |
| Talc | 1 | 1 | 1 | 1 | 1 | 1 | 1 | 1 | 1 | 1 | 1 | 1 | 1 | 1 | 1 |
| Natrosol | 1 | 1 | 1 | 1 | 1 | 1 | 1 | 1 | 1 | 1 | 1 | 1 | 1 | 1 | 1 |
| Tri-Manox | — | — | — | — | — | 3 | — | — | — | — | — | — | — | — | — |
| Ferro columbium | 6 | 7.5 | 7.5 | 7.5 | 7.5 | 7.5 | 7.5 | 7.5 | 7.5 | 7.5 | 7.5 | 7.5 | — | — | — |
| Strontium carbonate | — | — | — | — | — | — | — | 10 | 10 | 10 | 10 | 10 | 10 | 15 | 15 |
| Zirconium oxide | 5 | 10 | 10 | 10 | 10 | 10 | 10 | — | — | — | — | — | — | — | — |
| Cerium oxide | — | — | — | — | — | — | — | 5 | — | — | — | — | — | — | — |
| Cerium fluoride | — | — | — | — | — | — | — | — | 5 | — | — | — | — | — | — |
| Lanthanum carbonate | — | — | — | — | — | — | — | — | — | 5 | — | — | — | — | — |
| Synthetic cryolite | 20 | 19 | 19 | 19 | 19 | 19 | 25 | 25 | 25 | 25 | 30 | 20 | 25 | 25 | 14 |

The coated electrodes of Table 2 all provided acceptable weld deposits. Sample number 16 contained 4 parts by weight lithium carbonate which improved wetting, but produced bubbly slag and a dull bead. Sample number 17 had good weldability, but produced a slightly dull weld bead. Samples 18 and 19 produced a good weld bead with slight secondary slag 7hile 7elding vertically. Sample 20 contained 3 parts by weight potassium titanate that resulted in only a fair arc stability. In Sample number 21, Tri-Manox having a composition of (80) Mn3O4, 5% SiO2 and 10% Fe was added resulting in fair operability, a dull bead and a small weld puddle. In Sample 22 calcium fluoride was eliminated, producing a coated electrode that worked well. In Sample 24 contained cerium oxide which contributed to arc smoothness, but produced a secondary slag. Sample 25, which contained cerium fluoride, produced too fluid of a slag. Sample 25, at 30 parts by weight synthetic cryolite was slightly too fluid. Sample 27, at 20 parts by weight synthetic cryolite, had a small decrease in operability. The maximum out of position operability occurred at about 25 parts by weight cryolite. Nickel/niobium reduced iron pick-up, provided good wetting, but became too fluid in the overhead welding position. Sample number 29, at 3 parts by weight calcium fluoride, was not as good as Sample 2 in the overhead position. Sample 30, at 14 parts by weight calcium fluoride, was too fluid.

Table 3 contains additional test fluxes used with high chromium nickel-base alloy 691.

TABLE 3

| Ingredient | 31 | 32 | 33 | 34 | 35 | 36 | 37 | 38 |
|---|---|---|---|---|---|---|---|---|
| Bentonite | 2 | 2 | 2 | 2 | 2 | 2 | 2 | 2 |
| Calcium silicate | — | — | — | — | — | — | — | — |
| Calcium fluoride | — | — | — | — | — | 25 | — | — |
| Lithium carbonate | — | — | — | — | — | — | — | — |
| Nepheline syenite | — | — | — | — | — | — | — | — |
| Calcined alumina | 1 | 1 | 1 | 1 | 1 | 1 | 1 | 1 |
| Magnesium oxide | — | — | — | — | — | — | — | — |
| Electrolytic manganese | 10 | 10 | 10 | 10 | 10 | 10 | 10 | 10 |
| Chromium powder | 9 | 9 | 9 | 9 | 9 | 9 | 9 | 9 |
| Nickel powder | 4 | 4 | 4 | 4 | 4 | 4 | 4 | 4 |
| Magnetite | — | — | — | — | — | — | — | — |
| Rutile | 16 | 16 | 16 | 16 | 16 | 16 | 16 | 16 |
| Potassium titanate | — | — | — | — | — | — | — | — |
| Calcium Carbonate | 25 | — | 15 | 15 | 15 | 15 | 15 | 15 |
| Nickel columbium | — | — | — | — | — | — | — | — |
| Talc | 1 | 1 | 1 | 1 | 1 | 1 | 1 | 1 |
| Natrosol | 1 | 1 | 1 | 1 | 1 | 1 | 1 | 1 |
| Tri-Manox | — | — | — | — | — | — | — | — |
| Ferro columbium | 7.5 | 7.5 | 7.5 | 7.5 | 7.5 | 7.5 | 7.5 | — |
| Strontium carbonate | — | 25 | — | — | — | 10 | 10 | 10 |
| Lanthanum carbonate | — | — | — | 10 | — | — | — | — |
| Synthetic cryolite | 25 | 25 | 25 | 25 | 25 | — | — | 25 |
| Sodium fluoride | — | — | — | — | — | — | 25 | — |
| Barium carbonate | — | — | — | — | 10 | — | — | — |
| Manganese carbonate | — | — | 10 | — | — | — | — | — |
| Tungsten powder | — | — | — | — | — | — | — | 5 |

Of Table 3, all coated electrodes produced acceptable weld deposits. Good all around welding electrodes were produced by using 25 parts by weight calcium carbonate in Sample 31 and 25 parts by weight strontium carbonate in Sample number 32. Sample number 33 at 10 parts by weight magnesium carbonate provided good vertical welding with a bubbly slag. Similarly, Sample number 34 with 10 parts by weight lanthanum carbonate provided improved wetting and good vertical welding. Sample 35 contained 10 parts by weight barium carbonate which provided good out of position welding. However, a barium containing slag was produced and the composition would require rebaking prior to welding in an overhead position. In Sample number 36, at 25 parts by weight calcium fluoride, provided good operability, but poor operation in the vertical up mode of welding. Sample number 37 with 25 parts by weight sodium fluoride formula produced a bubbly slag which was difficult to remove. Sample number 38 which contained 5 parts by weight tungsten powder had improved vertical welding. Most advantageously, 0 to 10 parts by weight tungsten are added to the flux.

It was found by the above experimental flux compositions that total metal carbonate compounds should be present in a range from 5 to 35 parts by weight. Most advantageously, 10 to 30 parts by weight carbonates are present. Carbonates are used for creating a protected welding atmosphere and to facilitate arc stability and operability. Specific carbonates that may be inserted into the flux include calcium carbonate, strontium carbonate, lithium carbonate, magnesium carbonate, lanthanum carbonate and manganese carbonate, dolomite, and any combination thereof provided at least 3 parts by weight strontium carbonate are present. Strontium carbonate has been found to increase welding operability and especially improve welding operability during overhead welding. In fact as little as 3 parts by weight in a weld flux has been found to reduce or eliminate the requirement &/r rebaking coated electrodes prior to welding in an overhead position. Most advantageously, at least 5 parts by weight strontium carbonate is present.

To provide adequate slag fluidity, 10 to 40 parts by weight fluoride must be present. Most advantageously, 15 to 35 parts by weight fluorides are present in the weld flux. Acceptable fluorides include cryolite (natural or synthetic) cerium fluoride, lithium fluoride, a magnesium fluoride, strontium fluoride, potassium fluoride, potassium aluminum fluoride, potassium titanium fluoride, potassium zirconium fluoride and sodium fluoride or any combination thereof.

The flux also contains 5 to 45 parts by weight oxides to act as filler for controlling slag characteristics. Most advantageously, 10 to 35 parts by weight /xides are used. Acceptable oxides include rutile, calcium silicate, calcium oxide, silicon dioxide, magnetite, calcined alumina, magnesium oxide, potassium titanate, magnesium titanate, zirconia, cerium oxide and feldspar. Rutile is the most advantageous oxide to be used for controlling flux solidification temperature.

The flux also may contain metallic additions for matching the base metal to be welded. Advantageously, 5 to 50 parts by weight metallic additions are present. Most advantageously 8 to 30 parts by weight metallics are present. Metallic additions specifically include powders of manganese, electrolytic manganese, chromium, iron, molybdenum, tungsten, nickel-niobium, iron-niobium, chromium-molybdenum, chromium-niobium, chromium-tungsten, iron-aluminum, iron-chromium, iron-manganese, iron-titanium, nickel-magnesium, nickel-titanium and combinations thereof. Advantageously, 0 to 20 parts by weight manganese are added to the flux with at least 5 parts by weight manganese being added when less than 0.5 weight percent manganese is present in the core 7ire. Most advantageously, 0 to 20 parts by weight chromium powder and 0 to 15 parts by weight iron-niobium are added to the flux.

To hold the flux together, a binder most advantageously weighing 10 to 35 percent of the dry ingredients is added to hold the flux together. Binder ingredients include sodium silicate, potassium silicate, lithium silicate, sugar based binders and water. Mordex is a tradename for a sugar based binder having manufacturer's specifications of 76-77% total sugar, 38.5-46.5 inverted sugar, 30-38 sucrose and a pH of 3.7-4.7. Advantageously, 1 to 15 parts by 7eight extrusion and green strength ingredients are present in the flux. Most advantageously, 2 to 10 parts by weight extrusion aid and green strength ingredients are present. Extrusion and ingredients include talc, Natrosol brand hydroxyethylcellulose, alginate and mica. Bentonite most advantageously is used as a green strength enhancer. Most advantageously, 1 to 5 parts by weight bentonite is added directly to the flux.

Sample weld deposit chemistries are contained in Table 4.

TABLE 4

| WELD NO. | WIRE HEAT | MIX | DIAMETER (cm) | DIE SIZE (cm) | C | MN | FE | S | SI | NI | CR | AL | TI | (X) | NB | TA | P |
|---|---|---|---|---|---|---|---|---|---|---|---|---|---|---|---|---|---|
| 1 | 691 | 2 | .236 | .394 | .039 | 4.118 | 9.21 | 0.008 | 0.520 | 54.69 | 29.15 | 0.164 | 0.102 | 0.01 | 1.91 | 0.010 | 0.005 |
| 2 | 691 | 2 | .236 | .381 | .038 | 3.644 | 9.17 | 0.008 | 0.518 | 55.53 | 29.07 | 0.136 | 0.124 | 0.01 | 1.68 | 0.000 | 0.005 |
| 3 | 691 | 2 | .236 | .406 | .041 | 4.276 | 9.26 | 0.008 | 0.536 | 54.35 | 29.15 | 0.150 | 0.088 | 0.01 | 2.04 | 0.010 | 0.006 |
| 4 | 690 | 12 | .318 | .533 | .028 | 2.919 | 9.25 | 0.008 | 0.374 | 57.80 | 27.99 | 0.025 | 0.043 | 0.01 | 1.36 | 0.010 | 0.009 |
| 5 | 690 | 2 | .318 | .508 | .046 | 3.770 | 9.83 | 0.000 | 0.408 | 54.11 | 29.45 | 0.081 | 0.058 | 0.051 | 1.79 | 0.010 | 0.010 |
| 6 | 690 | 14 | .318 | .533 | .029 | 2.856 | 9.16 | 0.006 | 0.366 | 58.18 | 27.90 | 0.103 | 0.038 | 0.02 | 1.21 | 0.000 | 0.008 |
| 7 | 690 | 2 | .318 | .533 | .038 | 3.282 | 9.65 | 0.011 | 0.435 | 54.73 | 29.63 | 0.100 | 0.067 | 0.05 | 1.58 | 0.010 | 0.010 |
| 8 | 690 | 2 | .318 | .533 | .042 | 3.784 | 9.58 | 0.009 | 0.445 | 53.84 | 29.90 | 0.088 | 0.068 | 0.04 | 1.80 | 0.010 | 0.009 |
| 9 | 691 | 2 | .318 | .533 | .036 | 3.656 | 9.19 | 0.012 | 0.524 | 55.47 | 28.79 | 0.151 | 0.097 | 0.01 | 2.00 | 0.010 | 0.005 |
| 10 | 690 | 2 | .318 | .533 | .045 | 5.824 | 9.27 | 0.008 | 0.529 | 51.28 | 29.95 | 0.035 | 0.053 | 0.03 | 2.68 | 0.045 | 0.013 |
| 11 | 690 | 8 | .318 | .533 | .027 | 1.723 | 9.05 | 0.009 | 0.332 | 59.57 | 28.30 | 0.021 | 0.023 | 0.02 | 0.71 | 0.000 | 0.008 |
| 12 | 690 | 6 | .318 | .533 | .026 | 1.773 | 9.37 | 0.007 | 0.382 | 58.55 | 28.24 | 0.100 | 0.032 | 0.02 | 1.38 | 0.000 | 0.008 |
| 13 | 690 | 9 | .318 | .533 | .025 | 1.781 | 9.08 | 0.008 | 0.292 | 59.42 | 28.48 | 0.024 | 0.024 | 0.02 | 0.73 | 0.000 | 0.008 |
| 14 | 690 | 7 | .318 | .533 | .026 | 1.858 | 9.05 | 0.009 | 0.319 | 59.24 | 28.48 | 0.021 | 0.022 | 0.02 | 0.78 | 0.000 | 0.008 |
| 15 | 691 | 28 | .318 | .533 | .038 | 4.074 | 8.01 | 0.008 | 0.555 | 55.28 | 29.45 | 0.171 | 0.105 | 0.01 | 2.22 | 0.000 | 0.005 |
| 16 | 691 | 2 | .396 | .610 | .031 | 3.110 | 9.23 | 0.009 | 0.531 | 56.40 | 28.92 | 0.145 | 0.133 | 0.01 | 1.44 | 0.000 | 0.004 |
| 17 | 691 | 2 | .396 | .622 | .031 | 3.186 | 9.22 | 0.010 | 0.484 | 56.45 | 28.84 | 0.164 | 0.097 | 0.01 | 1.45 | 0.000 | 0.004 |
| 18 | 691 | 2 | .396 | .622 | .030 | 3.218 | 9.22 | 0.010 | 0.549 | 56.10 | 28.86 | 0.170 | 0.139 | 0.01 | 1.53 | 0.000 | 0.005 |
| 19 | 691 | 2 | .396 | .643 | .031 | 3.343 | 9.26 | 0.011 | 0.550 | 56.04 | 28.85 | 0.163 | 0.104 | 0.01 | 1.58 | 0.000 | 0.005 |
| 20 | 691 | 2 | .475 | .737 | .033 | 3.211 | 9.23 | 0.008 | 0.438 | 56.06 | 29.13 | 0.148 | 0.136 | 0.01 | 1.53 | 0.000 | 0.005 |
| 21 | 691 | 2 | .475 | .734 | .034 | 3.299 | 9.18 | 0.007 | 0.449 | 55.93 | 29.17 | 0.153 | 0.144 | 0.01 | 1.56 | 0.000 | 0.005 |
| 22 | 691 | 2 | .475 | .734 | .030 | 2.842 | 9.14 | 0.010 | 0.501 | 56.71 | 28.89 | 0.215 | 0.165 | 0.01 | 1.34 | 0.010 | 0.004 |
| 23 | 691 | 2 | .475 | .737 | .031 | 2.793 | 9.18 | 0.011 | 0.478 | 56.94 | 28.88 | 0.174 | 0.147 | 0.01 | 1.30 | 0.000 | 0.004 |
| 24 | 691 | 2 | .475 | .734 | .030 | 2.992 | 9.22 | 0.010 | 0.485 | 56.56 | 28.92 | 0.154 | 0.132 | 0.01 | 1.43 | 0.000 | 0.004 |
| 25 | 691 | 2 | .475 | .711 | .028 | 2.696 | 9.17 | 0.010 | 0.494 | 57.03 | 28.87 | 0.198 | 0.176 | 0.00 | 1.27 | 0.000 | 0.004 |
| 26 | 691 | 2 | .475 | .711 | .035 | 2.960 | 9.18 | 0.008 | 0.435 | 56.64 | 29.03 | 0.134 | 0.123 | 0.01 | 1.39 | 0.000 | 0.004 |

Table 4 illustrates flexibility in core wire material and diameter. In Table 4, all weld deposits contained the desired 27 to 30 weight percent chromium as desired for welding Inconel alloy 690. Alternatively, the coated electrode of the invention may be used for producing weld deposits matching nickel-base alloys having lower chromium contents such as Inconel alloy 600 which nominally contains by weight percent 72 minimum nickel (plus cobalt), 14 to 17 chromium, 6 to 10 iron, 0.15 maximum carbon, 1.00 maximum manganese, 0.015 maximum sulfur, 0.50 maximum silicon and 0.50 maximum copper. To produce an Inconel alloy 600 weld deposit, flux of the invention advantageously would be coated on an Inconel alloy 600 core wire.

The flux most advantageously contains in parts by weight 0 to 6 bentonite, 0 to 4 alumina, 0 to 20 chromium, 10 to 30 rutile, 0 to 4 talc, 0 to 15 iron columbium, 0 to 30 calcium carbonate, 5 to 25 strontium carbonate, 20 to 30 cryolite, 0 to 5 hydroxyethylcellulose, 0 to 20 nickel powder and 0 to 20 manganese powder with at least 5 parts by weight manganese being added when less than 0.5 weight percent manganese is present in the core wire, all combined with a silicate binder. Most advantageously, the total flux weighs 20 to 40 percent of the core wire. Mechanical properties for the most advantageous flux composition is contained in Table 5.

TABLE 5

| WELD | WIRE HEAT | MIX | DIAMETER (cm) | DIE SIZE (cm) | C | MN |
|---|---|---|---|---|---|---|
| 1 | 691 | 2 | .236 | .394 | 0.039 | 4.118 |
| 2 | 690 | 2 | .318 | .508 | 0.046 | 3.770 |
| 3 | 691 | 2 | .318 | .533 | 0.036 | 3.656 |
| 4 | 690 | 2 | .318 | .533 | 0.038 | 3.282 |
| 5 | 691 | 2 | .396 | .622 | 0.030 | 3.218 |
| 6 | 691 | 2 | .396 | .643 | 0.031 | 3.343 |
| 7 | 691 | 2 | .396 | .610 | 0.031 | 3.110 |
| 8 | 691 | 2 | .475 | .737 | 0.031 | 2.793 |
| 9 | 691 | 2 | .475 | .711 | 0.028 | 2.696 |
| 10 | 691 | 2 | .475 | .724 | 0.034 | 3.299 |

TABLE 5-continued

| WELD | NI | CR | NB | TI | YIELD STRENGTH (MPa) |
|---|---|---|---|---|---|
| 1 | 54.69 | 29.15 | 1.91 | 0.102 | 423 |
| 2 | 54.11 | 29.45 | 1.79 | 0.058 | 414 |
| 3 | 55.47 | 28.79 | 2.00 | 0.097 | 418 |
| 4 | 54.73 | 29.63 | 1.58 | 0.067 | 392 |
| 5 | 56.10 | 28.86 | 1.53 | 0.139 | 387 |
| 6 | 56.04 | 28.85 | 1.58 | 0.104 | 388 |
| 7 | 56.40 | 28.92 | 1.44 | 0.133 | 374 |
| 8 | 56.94 | 28.88 | 1.30 | 0.147 | 383 |
| 9 | 57.03 | 28.87 | 1.27 | 0.176 | 376 |
| 10 | 55.93 | 29.17 | 1.56 | 0.144 | 377 |

| WELD | TENSILE STRENGTH (MPa) | ELONG. (%) | REDUCTION AREA (%) | ROCKWELL VALUE (RB) |
|---|---|---|---|---|
| 1 | 677 | 40.00 | 51.9 | 94 |
| 2 | 685 | 42.00 | 51.0 | 91 |
| 3 | 665 | 40.00 | N/A | 94 |
| 4 | 638 | 43.00 | 47.5 | 94 |
| 5 | 643 | 43.00 | 57.8 | 91 |
| 6 | 642 | 46.00 | 45.7 | 91 |
| 7 | 637 | 40.00 | 53.9 | 91 |
| 8 | 632 | 41.00 | 48.6 | 91 |
| 9 | 630 | 43.00 | 48.6 | 90 |
| 10 | 645 | 44.00 | 52.3 | 90 |

The weld deposits of the invention of Table 5 all satisfied rigorous minimum requirements of 30% elongation and an ultimate tensile strength of about 550 MPa.

In summary, the invention provides a barium-free welding flux which eliminates hazardous waste requirements. In addition, the flux provides excellent arc stability, out of position welding, vertical welding and especially facilitates overhead welding. C/ated electrodes of the invention reduce or eliminate requirements for rebaking to provide porosity free welding in an overhead welding position.

While in accordance with the provisions of the statute, there is illustrated and described herein specific embodiments of the invention. Those skilled in the art will understand that changes may be made in the form The embodiments of the invention in which an exclusive property or privilege is claimed are defined as follows:

1. A coated electrode for producing a nickel-base weld deposit containing at least 12 weight percent chromium, the coated electrode including a flux surrounding a nickel-base core wire, said flux consisting essentially of, in parts by weight, 5 to 35 strontium carbonate with a total of 5 to 35 metal carbonate compound present in said flux, said strontium carbonate being for facilitating welding operability and especially for facilitating welding operability during overhead welding, said flux containing 5 to 20 parts by weight manganese when less than 0.5 weight percent manganese is present in said core wire and 0 to 20 parts by weight manganese when at least 0.5 weight percent manganese is present in the core wire, 10 to 40 fluoride compound, 5 to 45 oxide compound, and a binder for binding the flux to said core wire.

2. The flux of claim 1 additionally including 0 to 20 parts by weight chromium, 0 to 15 parts by weight iron-niobium and 0 to 10 parts by weight tungsten.

3. The flux of claim 1 additionally including in parts by weight 1 to 5 bentonite, 0 to 4 talc, 0 to 5 hydroxyethylcellulose, a silicate binder, said silicate binder weighing 10 to 35 percent of total weight of said flux.

4. The flux of claim 1 additionally including in parts by weight 0 to 4 calcined alumina.

5. The flux of claim 1 additionally including in parts by weight 20 to 30 cryolite.

6. The flux of claim 1 wherein said nickel-base core wire contains at least 20 weight percent chromium.

7. The flux of claim 1 wherein said nickel-base core wire contains 24 to 32 weight percent chromium and up to 15 weight percent iron.

8. The flux of claim 1 including in parts by weight 10 to 30 rutile.

9. A coated electrode for producing a nickel-base weld deposit containing at least 20 weight percent chromium, the coated electrode including a flux surrounding a nickel-base core wire, said flux consisting essentially of, in parts by weight, 5 to 35 strontium carbonate with a total of 5 to 35 metal carbonate compound present in said flux, said strontium carbonate being for facilitating welding operability and especially for facilitating welding operability during overhead welding, said flux containing 5 to 20 parts by weight manganese when less than 0.5 weight percent manganese is present in said core wire and 0 to 20 parts by weight manganese when at least 0.5 weight percent manganese is present in the core wire, 10 to 40 fluoride compound, 5 to 45 oxide compound, and a binder for binding the flux to said core wire.

10. The flux of claim 8 additionally including 0 to 20 parts by weight chromium and 0 to 15 parts by weight iron-niobium.

11. The flux of claim 8 additionally including in parts by weight 1 to 5 bentonite, 0 to 4 talc, 0 to 5 hydroxyethylcellulose, a silicate binder, said silicate binder weighing 10 to 35 percent of total weight of said flux.

12. The flux of claim 8 additionally including in parts by weight 0 to 4 calcined alumina.

13. The flux of claim 8 additionally including in parts by weight 20 to 30 cryolite.

14. The flux of claim 8 including in parts by weight 10 to 30 rutile.

15. The flux of claim 8 wherein said nickel-base core wire contains 24 to 32 chromium and 0 to 15 iron.

16. A coated electrode for producing a nickel-base weld deposit containing at least 20 weight percent chromium, the coated electrode including a flux surrounding a nickel-base core wire, said nickel-base core wire containing 24 to 32 weight percent chromium, up to 1 weight percent manganese and up to 15 weight percent iron, said flux consisting essentially of, in parts by weight, 5 to 25 strontium carbonate with a total of 5 to 35 metal carbonate compound presenting said flux, said strontium carbonate being for facilitating welding operability and especially for facilitating welding operability during overhead welding, said flux containing 5 to 20 parts by weight manganese when less than 0.5 weight percent manganese is present in said core wire and 0 to 20 parts by weight manganese when 0.5 or greater weight percent manganese when at least 0.5 weight percent manganese is present in the core wire, 0 to 20 chromium powder, 0 to 15 iron-niobium powder, 0 to 4 calcined alumina, 10 to 30 rutile, 20 to 30 cryolite and a binder for binding the flux to said core wire.

17. The flux of claim 16 additionally including in parts by weight 1 to 5 bentonite, 0 to 4 talc, 0 to 5 hydroxyethylcellulose, a silicate binder, said silicate binder weighing 10 to 35 percent of total weight of said flux.

18. The flux of claim 16 additionally including 0 to 10 parts by weight tungsten.

19. The flux of claim 16 wherein said flux has a weight, said core wire has a weight and said flux weight is 20 to 40% of said core wire weight.

* * * * *